Jan. 2, 1962   H. A. HALSTEAD ETAL   3,015,515
PRISONER CONFINING PARTITION FOR AUTOMOBILES
Filed Aug. 25, 1960   2 Sheets-Sheet 1
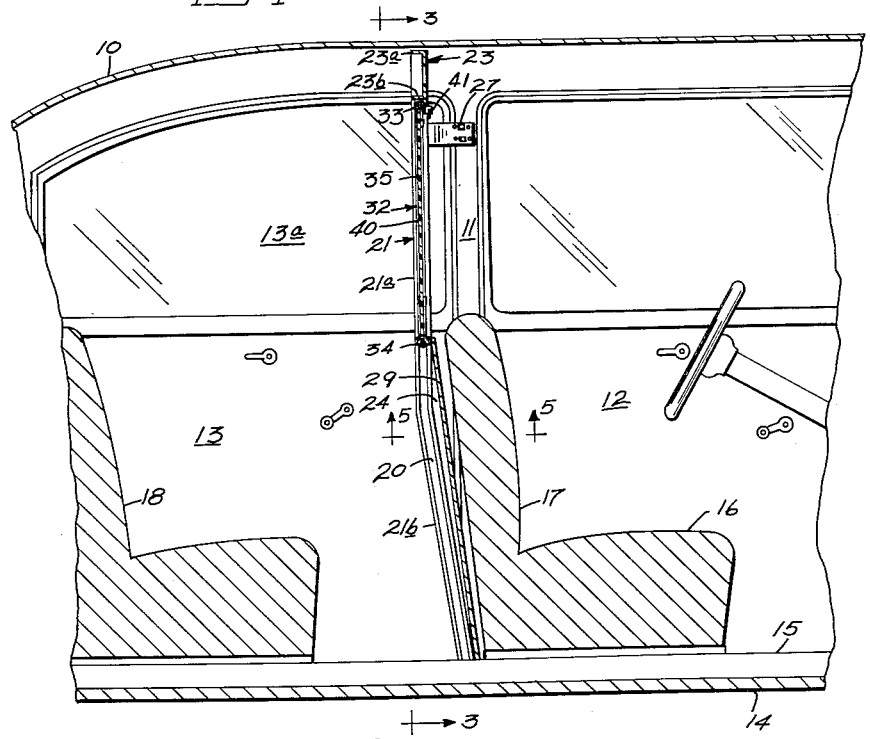
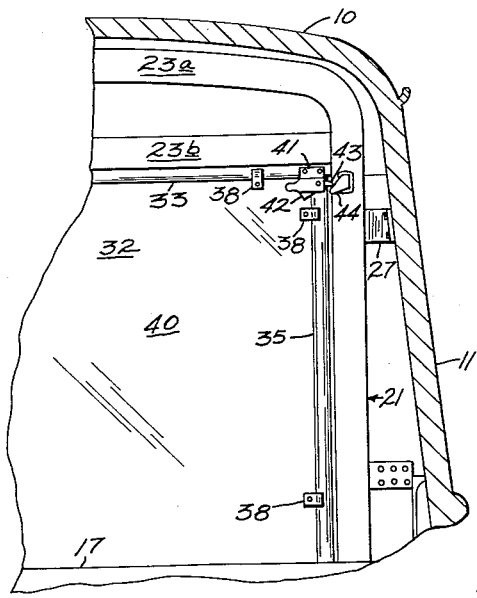
INVENTORS
Harold A. Halstead,
Harold A. Halstead, Jr.
Robert E. Halstead
By Wells & St. John
Attys.

Jan. 2, 1962 H. A. HALSTEAD ETAL 3,015,515
PRISONER CONFINING PARTITION FOR AUTOMOBILES
Filed Aug. 25, 1960 2 Sheets-Sheet 2
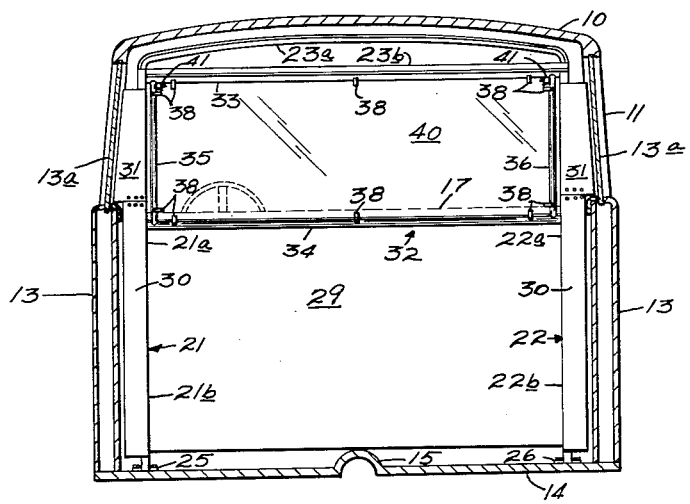
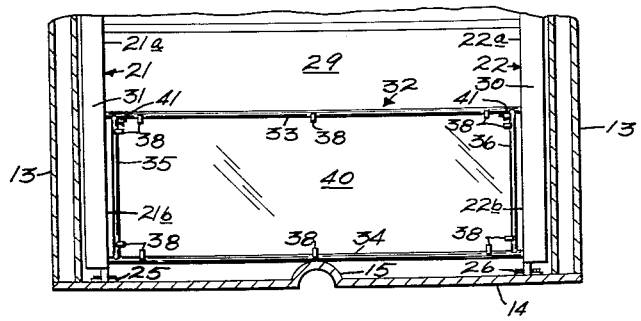
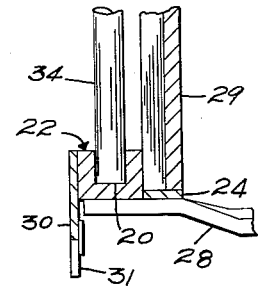
INVENTOR.
Harold A. Halstead, Sr.
Harold A. Halstead, Jr.
Robert E. Halstead
By Wells & St. John
Attys.

United States Patent Office 3,015,515
Patented Jan. 2, 1962

3,015,515
PRISONER CONFINING PARTITION
FOR AUTOMOBILES
Harold A. Halstead, Harold A. Halstead, Jr., and Robert E. Halstead, Spokane, Wash., assignors to Novelty Carriage Works, Inc., a corporation of Washington
Filed Aug. 25, 1960, Ser. No. 51,293
5 Claims. (Cl. 296—24)

This invention relates to a novel partition for an automobile adapted to confine a prisoner in the rear of a vehicle and to protect the driver from harm during transportation of the prisoner.

In particular instances, it is desirable to separate the front and back seat areas of an automobile interior to isolate persons in the rear seat from the operator of the automobile. Such protection is advisable in police prowl cars, which are often used to transport prisoners from one location to another. The isolation required may be effectively accomplished by the addition of a solid partition of glass, plastic or wire mesh. If such a partition is permanently installed, it will interfere with normal use of the automobile when such isolation is unnecessary. It is the first object of this invention to provide a partition which may be raised or lowered so as to be stored below the top of the front back rest when the partition is not required.

It is an object of this invention to provide such a partition which can be easily manipulated by a single person in the front seat position. The partition is also to be provided with locks which are actuated automatically when the partition is raised, but which can only be released on the front side of the partition.

It is another object of this invention to provide a movable barrier which can be shifted without requiring additional clearance beyond the limits of its own framework.

Another object is to provide a supporting frame having the necessary strength and rigidity, and providing an inner roll bar designed to strengthen the automobile body in instances where it might be overturned.

This invention has other desirable qualities and objects whose presence will be more apparent in the following discussion, which describes a preferred form of the invention. This form is merely illustrative and is not intended to limit or define the scope of the invention, which is set forth in the annexed claims.

In the drawings:

FIGURE 1 is a vertical sectional view taken lengthwise through an automobile equipped with a partition built according to this invention;

FIGURE 2 is an enlarged fragmentary view of the forward surface of the partition showing the latch mechanism;

FIGURE 3 is a vertical sectional view taken along line 3—3 in FIGURE 1;

FIGURE 4 is a fragmentary sectional view taken along the same line as FIGURE 3, but showing only the lower half of the partition with the movable section in its lowered position; and FIGURE 5 is an enlarged sectional view taken along line 5—5 in FIGURE 1 showing one side track.

It is the intention of this invention to provide an effective and practical partition between the front and rear seats of an automobile. As seen in FIGURE 1, the invention is specifically designed for a four door sedan having a roof 10, a vertical divider 11 between the front door 12 and rear door 13, and a floor 14 including a raised area 15. The front seat includes a cushion 16 and a backrest 17 and is occupied by the driver. The rear seat 18 is occupied by passengers and, in the case of police vehicles, may be used for the transportation of prisoners and freshly arrested criminal suspects. Obviously the driver of such an automobile is at a serious disadvantage while transporting prisoners, since his back must face them and his attention must be focussed on the control of his vehicle. Such an open arrangement invites assaults upon the person in the front seat, who is clearly exposed and vulnerable.

In order to provide protection while maintaining the normal utility of the automobile, a permanent partition having a movable section has been designed to fit any automobile. The partition consists of side channels 21 and 22 and an integral top portion 23 formed of two angle irons 23a, 23b, which serve as a brace and roll bar respectively as well as being a spacer for the interior partition. Each side channel 21, 22 has a vertical upper portion 21a, 22a extending from roof 10 to the forwardly sloping section 21b, 22b respectively, which extends toward the bottom of the backrest 17. Fixed to the front surface of side channels 21, 22 is a solid rectanglular plate 29 which extends parallel to the back of backrest 17 and covers the area from the top of raised area 15 in floor 14 to the top of backrest 17. This plate 29 is joined to the front surface of the side channels 21, 22 by means of a flange 24. Note FIGURE 5 for details of the channel construction. Plate 29 protects the backrest 17 from injury and serves as a permanent barrier between the two seating areas.

The side channels 21, 22 are adapted to be secured to the floor 14 by means of two stands 25, 26 formed on the lower ends of each channel 21, 22. The stands 25, 26 may be bolted or riveted to floor 14 as desired. Two ears 27, 28 are also provided near the upper ends of sides 21, 22 and are bent outwardly and forwardly so as to abut the vertical divider 11. These ears 27, 28 are also bolted or riveted to the vehicle and cooperate with stands 25, 26 to securely locate the side channels 21, 22. The space between the rear door 13 and the side channels 21, 22 is enclosed by a lower plate 30 and an upper plate 31 which are joined at their meeting line and which have outer edges conforming to the interior contour of the door 13. Plate 31 projects beyond plate 30 so as to enclose the area adjacent the rear door window 13a. Thus, an enclosed area is defined rearwardly adjacent to backrest 17, with only the area within the channels 21, 22 and above backrest 17 open between the front and rear seats.

This open area is adapted to be closed by a slidable section generally designated as 32. This section 32 is formed of a tubular frame having top and bottom members 33, 34 which project beyond side members 35, 36 and into the channel 20 along sides 21, 22. The tubular members 33—36 are rigidly joined to one another to provide a strong frame which is slidable along side channels 21, 22. Clips 37 are fixed along the members 33—36 and are fastened by rivets 38 to a sheet of transparent plastic 40. Sheet 40 may be any suitable material.

The slidable section 32 is locked in place by a pair of releasable latches 41 which are riveted to the forward surface of the top member 33. These latches 41 have a finger grip 42 which moves a catch 43 in a clockwise direction when squeezed. The catch 43 interacts with a fixed stop 44 fixed on the side channel 21 or 22. The catch 43 is biased in a counter-clockwise direction so as to be normally projecting outwardly. Thus it can be seen that the catch 43 will snap over stop 44 when the section 32 is raised, but will not move downward past stop 44 unless grip 42 is squeezed by someone in the front seat. There is sufficient clearance between the horizontal angle iron 23a and the top tubular member 33 to allow the latches 41 to be disengaged from stops 44.

The slidable section 32 can easily be moved upwardly from the storage position (FIGURE 4) to the locked position (FIGURE 3) by merely reaching over the backrest 17 or by pulling it upward from the rear seat position. But it can only be released from the locked position by someone in the front seat of the vehicle. This provides an effective shield for the driver and prevents damage to the vehicle and occupants. The roll bar 23b is useful as a brace for the automobile body should it roll over. It adds structural strength to the entire vehicle which can be extremely advantageous in cases of collision or other accidents likely to occur in a fast moving police automobile.

This invention provides a reliable barrier which does not interfere with normal usage of the vehicle. It requires little usable space and does not move outside the frame boundaries of the partition. Visibility is insured by a transparent section, and the open area between angle irons 23a, 23b provides an effective means of communication and ventilation between the front and rear seats. Minor modifications may present themselves to one skilled in this field without deviating from the invention. Therefore only the following enumerated claims are intended to limit and define the invention.

Having thus described our invention, we claim:

1. In an automobile body having front and rear seats, the front seat including a backrest extending between the sides of the automobile body, partition means for isolating the back seat area from the front seat area comprising:

a pair of inwardly facing side channels projecting upwardly behind the front seat backrest from the floor to the roof of the automobile body respectively adjacent the fixed dividers separating the front and rear doors at each side of the automobile;

bracket means fixed between said side channels and the automobile body;

a roll bar fixed across the upper ends of the side channels adjacent the roof of the automobile body;

a solid rectangular plate secured between the front exterior surfaces of said side channels and extending upwardly from the floor to the top of the front seat backrest;

a slidable section mounted between said side channels and slidably supported thereby for vertical motion along the length thereof;

and means on said side channels and said slidable section adapted to cooperatively engage one another to thereby maintain said slidable section in an elevated position.

2. In an automobile body having front and rear seats, the front seat including a backrest extending between the sides of the automobile body, partition means for isolating the back seat area from the front seat area comprising:

a pair of inwardly facing side channels projecting upwardly behind the front seat backrest from the floor to the roof of the automobile body respectively adjacent the fixed dividers separating the front and rear doors at each side of the automobile;

bracket means fixed between said side channels and the automobile body;

a roll bar fixed across the upper ends of the side channels adjacent the roof of the automobile body;

a solid rectangular plate secured between the front exterior surfaces of said side channels and extending upwardly from the floor to the top of the front seat backrest;

a slidable section mounted between said channel sides and slidably supported thereon, including top and bottom transverse horizontal members having outer ends slidably received between the flanges of said side channels, a pair of vertical side members connected between said top and bottom members adjacent said side channels, the separation between said top and bottom members being equal to the open distance between the top of said plate and the upper ends of said side channels;

mounting means fixed to said members adapted to secure a partition in the space bounded by said members;

and latch means on said side channels and said slidable section adapted to cooperatively engage one another to thereby maintain said slidable section in an elevated position.

3. In an automobile body having front and rear seats, the front seat including a backrest extending between the sides of the automobile body, partition means for isolating the back seat area from the front seat area comprising:

a pair of upright side channels extending from the floor to the roof of the automobile body and located adjacent the side walls thereof immediately rearward of the front backrest, said channels each including inwardly facing side flanges;

a rigid roll bar fixed across the top ends of said side channels;

bracket means rigidly locating said side channels relative to the automobile body;

a solid rectangular plate secured between the front exterior surfaces of said side channels and extending upwardly from the floor of the automobile body to the top of the front backrest;

a slidable section mounted between the side channels and including bearing portions slidably received between the side flanges of each side channel, said slidable section having a height sufficient to close off the area between the upper ends of the side channels and the top edge of said plates;

and cooperating latch members on the slidable section and on the side channels operable when engaged, to prevent downward motion of the slidable section from an elevated position wherein it closes off the area between the upper ends of the side channels and the top edge of said plate, said latch means being positioned on the front side of the partition to thereby be inaccessible from the rear seat area when the slidable section is in its elevated position.

4. The invention as defined in claim 3 wherein said slidable section comprises top and bottom transverse horizontal members having their outer ends projecting between the flanges of the respective side channels so as to be slidably supported thereby, and vertical side members rigidly fixed between said horizontal members adjacent the side channels;

and further comprising means mounted on said members adapted to secure a barrier intermediate their boundaries.

5. The invention as defined in claim 3 further comprising:

outwardly directed plates secured to the side channels along their lengths adapted to abut the interior automobile sides, the contour of the outer edges of said plates being complementary to the adjacent body surface abutted thereby.

References Cited in the file of this patent

UNITED STATES PATENTS

| | | |
|---|---|---|
| 2,502,538 | Stark | Apr. 4, 1950 |
| 2,566,032 | Poland | Aug. 28, 1951 |
| 2,782,069 | Storch | Feb. 19, 1957 |
| 2,865,670 | Dunn | Dec. 23, 1958 |
| 2,884,279 | Halstead et al. | Apr. 28, 1959 |